United States Patent
Kohyama et al.

(10) Patent No.: US 11,588,179 B2
(45) Date of Patent: Feb. 21, 2023

(54) METHOD FOR PRODUCING NON-AQUEOUS ELECTROLYTE SOLUTION, NON-AQUEOUS ELECTROLYTE SOLUTION, AND NON-AQUEOUS ELECTROLYTE SECONDARY BATTERY

(71) Applicant: Toyota Jidosha Kabushiki Kaisha, Toyota (JP)

(72) Inventors: Akira Kohyama, Toyota (JP); Koji Okuda, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 42 days.

(21) Appl. No.: 16/250,129

(22) Filed: Jan. 17, 2019

(65) Prior Publication Data
US 2019/0229373 A1 Jul. 25, 2019

(30) Foreign Application Priority Data
Jan. 19, 2018 (JP) .............................. JP2018-007548

(51) Int. Cl.
*H01M 10/0568* (2010.01)
*H01M 10/0569* (2010.01)
*H01M 10/052* (2010.01)

(52) U.S. Cl.
CPC ..... *H01M 10/0569* (2013.01); *H01M 10/052* (2013.01); *H01M 10/0568* (2013.01); *H01M 2300/0037* (2013.01)

(58) Field of Classification Search
None
See application file for complete search history.

(56) References Cited

U.S. PATENT DOCUMENTS

| 2005/0196670 A1 | 9/2005 | Yamaguchi et al. |
| 2005/0233222 A1 | 10/2005 | Yanagida et al. |
| 2010/0081062 A1 | 4/2010 | Chiga et al. |

(Continued)

FOREIGN PATENT DOCUMENTS

| CN | 105556729 A | 5/2016 |
| CN | 107004909 A | 8/2017 |

(Continued)

OTHER PUBLICATIONS

Xu et al, LiBOB as Salt for Lithium-Ion Batteries, 5(1) Electrochemical and Solid-State Letters, (2002)) (Year: 2002).*

*Primary Examiner* — Yoshitoshi Takeuchi
(74) *Attorney, Agent, or Firm* — Dinsmore & Shohl LLP (57) ABSTRACT

A non-aqueous electrolyte secondary battery which uses a non-aqueous electrolyte solution in which a main component of a non-aqueous solvent is a fluorinated solvent, and by which it is possible to suitably prevent a decrease in battery capacity. A method for producing the non-aqueous electrolyte solution disclosed here includes a fluorinated solvent provision step for preparing the fluorinated solvent, a highly polar solvent provision step for preparing a highly polar solvent having a relative dielectric constant of 40 or more, a LiBOB dissolution step for preparing a highly concentrated LiBOB solution by dissolving LiBOB in the highly polar solvent at a concentration that exceeds the saturation concentration in the fluorinated solvent, and a mixing step for mixing the fluorinated solvent with the highly concentrated LiBOB solution.

17 Claims, 2 Drawing Sheets

(56) References Cited

U.S. PATENT DOCUMENTS

| | | | |
|---|---|---|---|
| 2010/0209782 A1 | 8/2010 | Choi et al. | |
| 2013/0316229 A1* | 11/2013 | Sawa | H01M 10/0567 |
| | | | 429/200 |
| 2014/0302401 A1 | 10/2014 | Burkhardt et al. | |
| 2014/0302402 A1* | 10/2014 | Chen | H01M 4/525 |
| | | | 429/333 |
| 2015/0037690 A1 | 2/2015 | Dalavi et al. | |
| 2015/0118576 A1 | 4/2015 | Chiga et al. | |
| 2015/0147644 A1 | 5/2015 | Kinoshita et al. | |
| 2015/0147662 A1 | 5/2015 | Park et al. | |
| 2015/0380769 A1 | 12/2015 | Chiga et al. | |
| 2016/0020490 A1 | 1/2016 | Yamaguchi | |
| 2016/0079629 A1 | 3/2016 | Abe et al. | |
| 2016/0087307 A1 | 3/2016 | Burkhardt et al. | |
| 2016/0315354 A1 | 10/2016 | Okada et al. | |
| 2016/0372754 A1 | 12/2016 | Takebayashi | |
| 2017/0250445 A1* | 8/2017 | Burkhardt | H01M 4/505 |

FOREIGN PATENT DOCUMENTS

| | | | | |
|---|---|---|---|---|
| JP | 2005259592 A | 9/2005 | | |
| JP | 2010-192430 A | 9/2010 | | |
| JP | 2017134986 A | 8/2017 | | |
| JP | 2017-531285 A | 10/2017 | | |
| KR | 20150138326 A | 12/2015 | | |
| WO | 2014165748 A1 | 10/2014 | | |
| WO | 2016025589 A1 | 2/2016 | | |
| WO | WO-2016025589 A1 * | 2/2016 | | H01M 6/164 |

\* cited by examiner

METHOD FOR PRODUCING NON-AQUEOUS ELECTROLYTE SOLUTION, NON-AQUEOUS ELECTROLYTE SOLUTION, AND NON-AQUEOUS ELECTROLYTE SECONDARY BATTERY

CROSS REFERENCE TO RELATED APPLICATIONS

This application claims priority to Japanese Patent Application No, 2018-007548 filed on Jan. 19, 2018, the entire contents of which are hereby incorporated by reference.

BACKGROUND

1. Field

The present disclosure relates to a non-aqueous electrolyte solution. More specifically, the present disclosure relates to a non-aqueous electrolyte solution in which a lithium salt is dissolved in a non-aqueous solvent that contains a fluorinated solvent as a main component; a method for producing the non-aqueous electrolyte solution; and a non-aqueous electrolyte secondary battery.

2. Description of the Related Art

In recent years, secondary batteries such as lithium ion secondary batteries have been advantageously used as portable power sources for hand-held devices and as power supplies for vehicle propulsion. In particular, lithium ion secondary batteries able to achieve high energy density and low weight are becoming increasingly important as high output power sources fitted to vehicles such as electric vehicles and hybrid vehicles. Non-aqueous electrolyte solutions (hereinafter also referred to simply as "electrolyte solutions") obtained by dissolving supporting electrolytes such as lithium salts in non-aqueous solvents (organic solvents) are generally used in such secondary batteries.

In order to meet demands for higher input output and higher energy density in the technical field of non-aqueous electrolyte secondary batteries in recent years, positive electrode active substances (high, potential positive electrode active substances) having upper limit operating potentials of 4.35 V (vs. Li/Li$^+$) or more have been developed. However, when such high potential positive electrode active substances are used, the potential of the positive electrode becomes extremely high at full charge, and oxidative decomposition of the electrolyte solution readily occurs, which leads to concerns regarding a decrease in battery capacity.

In order to suppress such oxidative decomposition of a non-aqueous electrolyte solution at full charge, the technique of using a fluorinated solvent as a main component of a non-aqueous solvent of a non-aqueous electrolyte solution has been proposed (for example, see Japanese Patent Application Publication No, 2017-134986). Because such fluorinated solvents exhibit high resistance to oxidation, it is possible to advantageously suppress oxidative decomposition at full charge even in cases where a high potential positive electrode active substance is used.

In addition, in non-aqueous electrolyte secondary batteries, some of the non-aqueous electrolyte solution undergoes reductive decomposition during initial charging and a coating film known as a solid electrolyte interface (SEI) film is formed on a surface of the negative electrode active substance in some cases. Because a negative electrode is stabilized by the formation of this SEI film, subsequent reductive decomposition of the electrolyte solution is suppressed. However, because formation of a SEI film by reductive decomposition of a non-aqueous electrolyte solution is an irreversible reaction, this can also be a cause of a decrease in battery capacity.

As a result, techniques for dissolving a coating film-forming agent (for example, lithium bis(oxalato)borate (LiBOB) or the like), which forms a SEI film through decomposition at a lower potential than an electrolyte solution, in a non-aqueous electrolyte solution have been proposed in recent years (for example, see Japanese Patent Application Publication No. 2005-259592). Therefore, because it is possible to form a SEI film derived from a coating film-forming agent before a non-aqueous electrolyte solution decomposes, reductive decomposition of the non-aqueous electrolyte solution can be suppressed. In addition, Japanese Patent Application Publication No. 2017-134986 discloses the technique of adding a coating film-forming agent such as LiBOB to a non-aqueous electrolyte solution in which a main component of a non-aqueous solvent is a fluorinated solvent.

SUMMARY

However, in cases where a non-aqueous electrolyte solution in which a main component of a non-aqueous solvent is a fluorinated solvent was actually used, it was difficult to satisfactorily exhibit the advantageous effect of the addition of LiBOB. Therefore, reductive decomposition of the non-aqueous electrolyte solution during initial charging could not be satisfactorily suppressed, and battery capacity decreased.

Specifically, because a non-aqueous solvent in which a main component is a fluorinated solvent has the characteristic of exhibiting high resistance to oxidation while having low resistance to reduction, it was necessary to dissolve a large quantity of LiBOB in order to suitably suppress reductive decomposition during initial charging. However, because it is extremely difficult to dissolve LiBOB in such fluorinated solvents (the saturation solubility is approximately 0.002 M), it is extremely difficult for LiBOB to be present at a quantity required to suppress reductive decomposition during initial charging. Therefore, in cases where a non-aqueous electrolyte solution in which a main component of a non-aqueous solvent is a fluorinated solvent is used, the concentration of LiBOB tends to be insufficient, a large quantity of non-aqueous electrolyte solution undergoes reductive decomposition during initial charging, and this leads concerns that battery capacity will decrease.

The present embodiments have been developed with such problems in mind, and have the main purpose of providing a non-aqueous electrolyte secondary battery which uses a non-aqueous electrolyte solution in which a main component of a non-aqueous solvent is a fluorinated solvent, and by which it is possible to suitably prevent a decrease in battery capacity.

In order to achieve this purpose, the present disclosure provides a method for producing a non-aqueous electrolyte solution having the configuration described below (hereinafter also referred to simply as a "production method").

The method for producing a non-aqueous electrolyte secondary battery disclosed here is a method for producing a non-aqueous electrolyte solution in which a lithium salt is dissolved in a non-aqueous solvent that contains a fluorinated solvent as a main component.

This method for producing a non-aqueous electrolyte secondary battery includes a fluorinated solvent provision step for providing the fluorinated solvent, a highly polar solvent provision step for providing a highly polar solvent having a relative dielectric constant of 40 or more, a LiBOB dissolution step for preparing a highly concentrated LiBOB solution by dissolving LiBOB in the highly polar solvent at a concentration that exceeds the saturation concentration in the fluorinated solvent, and a mixing step for mixing the fluorinated solvent with the highly concentrated LiBOB solution.

In order to solve the problems mentioned above, the inventor of the present disclosure conducted many experiments into means for dissolving a sufficient quantity of LiBOB in a non-aqueous electrolyte solution in which a main component of a non-aqueous solvent is a fluorinated solvent.

In the course of these experiments, the inventor of the present disclosure first thought of using a mixed solvent obtained by mixing a fluorinated solvent with a highly polar solvent. Highly polar solvent means a non-aqueous solvent which has a relative dielectric constant 40 or more and which can dissolve a much larger quantity of LiBOB than can a fluorinated solvent. As a result of these experiments, the inventor of the present disclosure found that a mixed solvent containing a highly polar solvent could dissolve more LiBOB than could a non-aqueous solvent consisting of a fluorinated solvent. Specifically, it was understood that LiBOB could be dissolved at a quantity of approximately 0.02 M in a mixed solvent containing 10% of a highly polar solvent.

However, the amount of LiBOB is still insufficient at a concentration of approximately 0.02 M, and it was necessary to mix more than 10% of a highly polar solvent in order to dissolve LiBOB at a quantity whereby reductive decomposition during charging could be satisfactorily suppressed. However, if the mixing proportion of the highly polar solvent is too high, the mixing proportion of the fluorinated solvent decreases and the oxidation resistance of the non-aqueous electrolyte solution decreases, meaning that battery capacity actually decreases due to oxidative decomposition at full charge.

Therefore, as a result of numerous experiments, the inventor of the present disclosure discovered that because a trade-off relationship such as that mentioned above occurs when a main component of a non-aqueous solvent is a fluorinated solvent, it was difficult to suppress both oxidative decomposition at full charge and reductive decomposition during initial charging to a high degree simply by mixing a highly polar solvent and a fluorinated solvent.

As a result, the inventor of the present disclosure carried out further experiments into techniques for overcoming the trade-off relationship mentioned above. As a result, it was discovered that by dissolving a large quantity of LiBOB in a highly polar solvent prior to mixing with a fluorinated solvent, and then mixing the fluorinated solvent with the highly polar solvent in which a large quantity of LiBOB had been dissolved (a highly concentrated LiBOB solution), it was possible to dissolve a sufficient quantity of LiBOB even in cases where a non-aqueous solvent in which a main component was a fluorinated solvent was used.

Specifically, if a solution in which a large quantity of solute is dissolved at a high concentration is mixed with a solvent for which the saturation solubility of the solute is low, the amount of solute that exceeds the saturation solubility is generally precipitated immediately after mixing. As a result of experiments, however, the inventor of the present disclosure discovered that in cases where a highly polar solvent in which a large quantity of LiBOB had been dissolved (a highly concentrated LiBOB solution) was mixed with a fluorinated solvent, the LiBOB could be held for a long time in a dissolved state in the non-aqueous solvent at a concentration that exceeded the saturation solubility. This is thought to be because when the highly concentrated LiBOB solution is prepared, LiBOB molecules are surrounded by highly polar solvent molecules and are in a solvated state, and this solvated state is maintained even after the non-aqueous electrolyte solution is prepared by mixing the highly polar solvent and the fluorinated solvent.

The method for producing a non-aqueous electrolyte solution disclosed here has been developed on the basis of the findings mentioned above, and includes a LiBOB dissolution step for preparing a highly concentrated LiBOB solution and a mixing step for mixing a fluorinated solvent with the highly concentrated LiBOB solution. According to this production method, it is possible to produce a non-aqueous electrolyte solution in which a sufficient quantity of LiBOB is dissolved without precipitating, despite a main component of the non-aqueous solvent being a fluorinated solvent. This non-aqueous electrolyte solution exhibits high resistance to oxidation by using a non-aqueous solvent in which a main component is a fluorinated solvent, but exhibits high resistance to reduction because a sufficient quantity of LiBOB is dissolved. Therefore, by using this non-aqueous electrolyte solution, it is possible to suppress both oxidative decomposition at full charge and reductive decomposition during initial charging to a high degree and produce a secondary battery in which a decrease in battery capacity is suitably prevented.

In one aspect of the method for producing a non-aqueous electrolyte solution disclosed here, the volume of the fluorinated solvent is 80 to 95 vol % when the total volume of the non-aqueous solvent is taken as 100 vol %.

As mentioned above, the non-aqueous solvent may contain a sufficient quantity of the fluorinated solvent in order to suitably suppress oxidative decomposition of the electrolyte solution at full charge. However, if the volume of the fluorinated solvent is too high, the volume of the highly polar solvent decreases, meaning that LiBOB readily precipitates when the highly concentrated LiBOB solution is mixed with the fluorinated solvent. From this perspective, in some embodiments the volume of the fluorinated solvent relative to the total volume of the non-aqueous solvent may be set within the range mentioned above.

In another aspect of the method for producing a non-aqueous electrolyte solution disclosed here, the concentration of LiBOB in the highly concentrated LiBOB solution is 1 to 4 M.

If the concentration of LiBOB in the highly concentrated LiBOB solution is too low, the mixing proportion of the highly concentrated LiBOB solution must be increased in order to produce a non-aqueous electrolyte solution having the desired LiBOB concentration. In such cases, the volume of the fluorinated solvent in the non-aqueous solvent decreases, which leads to concerns that the oxidation resistance of the non-aqueous electrolyte solution will deteriorate. From this perspective, in some embodiments as much LiBOB as possible may be dissolved in the highly concentrated LiBOB solution (for LiBOB to be dissolved up to the saturation solubility in the highly polar solvent). From this perspective, the concentration of LiBOB in the highly concentrated LiBOB solution may fall within the range mentioned above in some embodiments.

In yet another aspect of the method for producing a non-aqueous electrolyte solution disclosed here, a lithium salt dissolution step for dissolving the lithium salt in the fluorinated solvent is carried out before carrying out the mixing step.

By dissolving the lithium salt in the fluorinated solvent before mixing with the highly concentrated LiBOB solution in this way, the required quantity of lithium salt can be easily dissolved.

In another aspect of the method for producing a non-aqueous electrolyte solution disclosed here, the highly polar solvent contains any of ethylene carbonate, propylene carbonate, sulfolane, 1,3-propane sultone and 1-propene 1,3-sultone.

These highly polar solvents can dissolve a sufficient quantity of LiBOB, and can advantageously maintain the dissolved LiBOB in a solvated state. Therefore, it is possible to produce a non-aqueous electrolyte solution in which a sufficient quantity of LiBOB is dissolved, without precipitating.

In a another aspect of the method for producing a non-aqueous electrolyte solution disclosed here, the fluorinated solvent contains either of a fluorinated cyclic carbonate and a fluorinated linear carbonate. In some embodiments, the fluorinated cyclic carbonate may be any of 4-fluoroethylene carbonate, 4,5-difluoroethylene carbonate and trifluoromethylethylene carbonate. In some embodiments, the fluorinated linear carbonate may be methyl-2,2,2-trifluoroethyl carbonate.

By using, these fluorinated carbonates as fluorinated solvents, it is possible to advantageously improve the oxidation resistance of the non-aqueous electrolyte solution and more suitably suppress oxidation resistance at full charge.

In addition, a non-aqueous electrolyte solution having the configuration below is provided as another aspect of the present disclosure.

In the non-aqueous electrolyte solution disclosed here, a lithium salt and LiBOB are dissolved in a non-aqueous solvent that contains a fluorinated solvent as a main component. In this non-aqueous electrolyte solution, the non-aqueous solvent contains a highly polar solvent having a relative dielectric constant of 40 or more, the volume of the fluorinated solvent is 80 to 95 vol % when the total volume of the non-aqueous solvent is taken as 100 vol %, and the concentration of LiBOB is 0.1 M or more.

The non-aqueous electrolyte solution disclosed here is produced using the production method of the aspect described above. This non-aqueous electrolyte solution exhibits high oxidation resistance because a main component of the non-aqueous solvent is a fluorinated solvent. In addition, this non-aqueous electrolyte solution exhibits high reduction resistance because a sufficient quantity of LiBOB, such as 0.1 M or more, is dissolved. Therefore, according to the non-aqueous electrolyte solution disclosed here, it is possible to produce a non-aqueous electrolyte secondary battery in which oxidative decomposition at full charge and reductive decomposition during initial charging are suppressed to a high degree and in which a decrease in battery capacity is suitably prevented.

In addition, a non-aqueous electrolyte secondary battery having the configuration below is provided as another aspect of the present disclosure.

In the non-aqueous electrolyte secondary battery disclosed here, an electrode body having a positive electrode and a negative electrode is housed in a case and a non-aqueous electrolyte solution is filled between the positive electrode and the negative electrode. In addition, in this secondary battery, the non-aqueous electrolyte solution is a non-aqueous electrolyte solution in which a lithium salt and LiBOB are dissolved in a non-aqueous solvent that contains a fluorinated solvent as a main component, and a SEI film derived from the LiBOB is formed on a surface of the negative electrode. Furthermore, in the secondary battery disclosed here, the volume of the fluorinated solvent is 80 to 95 vol % when the total volume of the non-aqueous solvent is taken as 100 vol %, and the amount of components in the SEI film at are derived from the LiBOB is 0.1 to 0.4 mg/cm$^2$. Moreover, "the amount of components in the SEI film that are derived from the LiBOB" in the present specification means the detected amount of boron (B), which is the central element in the SEI film derived from the LiBOB.

The non-aqueous electrolyte secondary battery disclosed here is a secondary battery produced using the non-aqueous electrolyte solution of the aspect described above. In this secondary battery, a main component of the non-aqueous solvent is a fluorinated solvent and a non-aqueous electrolyte solution having a high oxidation resistance is used, and it is therefore possible to suitably suppress oxidative decomposition of the non-aqueous electrolyte solution at full charge. Furthermore, because this secondary battery is produced using a non-aqueous electrolyte solution in which LiBOB is dissolved at a sufficient concentration, a SEI film derived from the LiBOB is satisfactorily formed when initial charging is carried out (the amount of components of the SEI film following initial charging is 0.1 to 0.4 mg/cm$^2$). Therefore, reductive decomposition of the non-aqueous electrolyte solution during initial charging is suitably suppressed, and high battery capacity is achieved. Therefore, in the non-aqueous electrolyte secondary battery disclosed here, oxidative decomposition at full charge and reductive decomposition during initial charging are suppressed to a high degree and a decrease in battery capacity is suitably prevented.

DETAILED DESCRIPTION

Embodiments of the present disclosure will now be explained. Moreover, matters which are essential for carrying out the present disclosure and which are matters other than those explicitly mentioned in the present disclosure are matters that a person skilled in the art could understand to be matters of design on the basis of the prior art in this technical field. The present disclosure can be carried out on the basis of the matters disclosed in the present specification and common general technical knowledge in this technical field.

1. Method for Producing Non-Aqueous Electrolyte Solution

Figure 1:
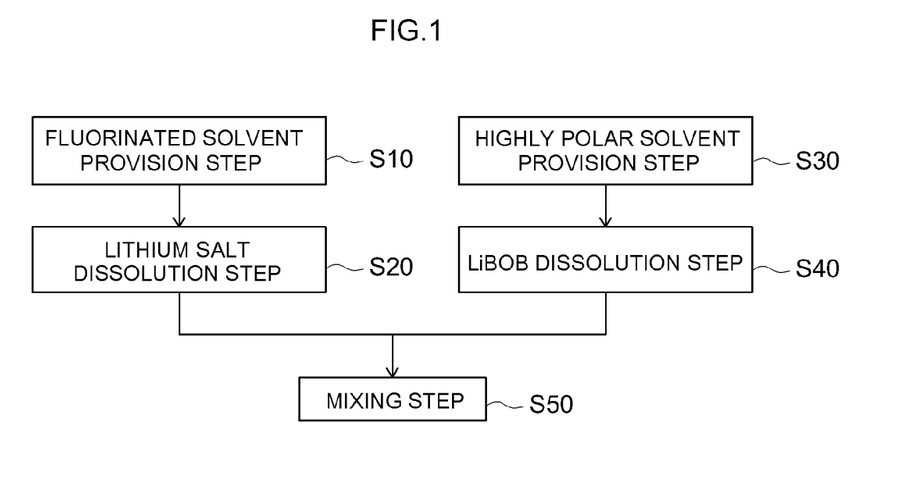
FIG. 1 is a flow chart that schematically illustrates a method for producing a non-aqueous electrolyte solution according to one embodiment of the present disclosure.

FIG. 1 is a flow chart that schematically illustrates a method for producing the non-aqueous electrolyte solution according to the present embodiment. The method for producing a non-aqueous electrolyte solution according to the present embodiment is a method for producing a non-aqueous electrolyte solution in which a lithium salt is dissolved in a non-aqueous solvent that contains a fluorinated solvent as a main component. As shown in FIG. 1, this production method includes a fluorinated solvent provision step S10, a lithium salt dissolution step S20, a highly polar solvent provision step S30, a LiBOB dissolution step S40 and a mixing step S50.

(1) Fluorinated Solvent Provision Step

In the production method according to the present embodiment, the fluorinated solvent provision step S10 is first carried out. The fluorinated solvent prepared in this step is a non-aqueous solvent in which a part of a carbonate compound having a carbonate skeleton (O—CO—O) is substituted with fluorine. Specific examples of such fluorinated solvents include fluorinated cyclic carbonates and fluorinated linear carbonates. Here, "fluorinated cyclic carbonate" means a carbonate compound having a chemical structure that is closed into a ring by a C—C bond, and a part of the compound is substituted with fluorine. Here, "fluorinated linear carbonate" means a carbonate compound having an acyclic (linear) chemical structure, and a part of the compound is substituted with fluorine. Because these fluorinated solvents exhibit high oxidation resistance, it is possible to suitably suppress oxidative resistance of the non-aqueous electrolyte solution at full charge and prevent a decrease in battery capacity by using these fluorinated solvents as a main component of the non-aqueous solvent.

Moreover, examples of the fluorinated cyclic carbonate include 4-fluoroethylene carbonate (FEC), 4,5-difluoroethylene carbonate (DFEC) and trifluoromethylethylene carbonate (TFMEC). By using these fluorinated cyclic carbonates as fluorinated solvents, it is possible to more suitably improve the oxidation resistance of the non-aqueous electrolyte solution at full charge. In addition, 4,4-difluoroethylene carbonate, trifluoroethylene carbonate, tetrafluoroethylene carbonate, fluoromethylethylene carbonate, difluoromethylethylene carbonate, bis(fluoromethyl)ethylene carbonate, bis(difluoromethyl)ethylene carbonate, bis(trifluoromethyl)ethylene carbonate, fluoroethylethylene carbonate, difluoroethylethylene carbonate, trifluoroethylethylene carbonate, tetrafluoroethylethylene carbonate, and the like, can be given as other examples of the fluorinated cyclic carbonate.

In addition, examples of the fluorinated linear carbonate include methyl-2,2,2-trifluoroethyl carbonate (MTFEC) and the like. By using MTFEC as a fluorinated solvent, it is possible to more suitably improve the oxidation resistance of the non-aqueous electrolyte solution at full charge. In addition, fluoromethylmethyl carbonate, difluoromethylmethyl carbonate, trifluoromethylmethyl carbonate, fluoromethyldifluoromethyl carbonate, bis(fluoromethyl) carbonate, bis(difluoromethyl) carbonate, bi(trifluoromethyl) carbonate, (2-fluoroethyl)methyl carbonate, ethylfluoromethyl carbonate, (2,2-difluoroethyl)methyl carbonate, (2-fluoroethyl) fluoromethyl carbonate, ethyldifluoromethyl carbonate, (2,2,2-trifluoroethyl)methyl carbonate (TFEMC), (2,2-difluoroethyl)fluoromethyl carbonate, (2-fluoroethyl)difluoromethyl carbonate, ethyltrifluoromethyl carbonate, ethyl-(2-fluoroethyl) carbonate, ethyl-(2,2-difluoroethyl) carbonate, bis(2-fluoroethyl) carbonate, ethyl-(2,2,2-trifluoroethyl) carbonate, ethyl-(2,2,2-trifluoroethyl) carbonate, 2,2-difluoromethyl-2'-fluoroethyl carbonate, bis(2,2-difluoroethyl) carbonate, 2,2,2-trifluoroethyl-2'-fluoroethyl carbonate, 2,2,2-trifluoroethyl-2',2'-difluoroethyl carbonate, bis (2,2,2-trifluoroethyl) carbonate, pentafluoroethylmethyl carbonate, pentafluoroethylfluoromethyl carbonate, pentafluoroethylethyl carbonate, bis(pentafluoroethyl) carbonate, and the like, can be given as other examples of the fluorinated linear carbonate.

(2) Lithium Salt Dissolution Step

In the present embodiment, the lithium salt dissolution step S20 is next carried out, in, which a lithium salt is dissolved in the fluorinated solvent prepared in the fluorinated solvent provision step S10.

For example, one or two or more types such as $LiPF_6$, $LiBF_4$, $LiClO_4$, $LiAsF_6$, $LiCF_3SO_3$, $LiC_4F_9SO_3$, $LiN(CF_3SO_2)_2$, $LiC(CF_3SO_2)_3$, LiI or $LiN(FSO_2)_2$ can be used as the lithium salt.

In some embodiments, a lithium salt is dissolved in this step from the perspective of the lithium salt concentration in the non-aqueous electrolyte solution following production. Details are given below, but in the production method according to the present embodiment, a non-aqueous electrolyte solution is produced by mixing a fluorinated solvent in which a lithium salt is dissolved with a highly polar solvent in which LiBOB is dissolved. Therefore, the quantity of lithium salt added in this step may be specified from the perspective of the lithium salt concentration after mixing with the highly polar solvent. Specifically, the amount of lithium salt dissolved in this step may be adjusted so that the lithium salt concentration in the non-aqueous electrolyte solution following production is 0.5 to 2 mol/L (for example, 1 mol/L).

(3) Highly Polar Solvent Provision Step

In the present embodiment, the highly polar solvent provision step S30 is next carried out separately from the fluorinated solvent provision step S10 and the lithium salt dissolution step S20.

The "highly polar solvent" prepared in this step is a non-aqueous solvent having a relative dielectric constant of 40 or more (such as 40 to 120, or even 70 to 100). Specific examples of highly polar solvents that satisfy this condition include ethylene carbonate (EC, relative dielectric constant: 95.3), propylene carbonate (PC, relative dielectric constant: 64.4), sulfolane (SL, relative dielectric constant: 44), 1,3-propane sultone (PS, relative dielectric constant: 94) and 1-propene 1,3-sultone (PRS, relative dielectric constant: 90). These highly polar solvents can dissolve a large quantity of LiBOB, and can satisfactorily maintain the dissolved LiBOB in a solvated state. Therefore, these highly polar solvents can be used particularly advantageously as solvents when preparing the highly concentrated LiBOB solution mentioned above. In addition, among these highly polar solvents, EC exhibits relatively high oxidation resistance, and can therefore also contribute to suppressing oxidative decomposition of the non-aqueous electrolyte solution at full charge.

(4) LiBOB Dissolution Step

Next, the LiBOB dissolution step S40 is carried out, in which the highly concentrated LiBOB solution is prepared by dissolving lithium bis(oxalato)borate (LiBOB) in the highly polar solvent prepared in the highly polar solvent provision step S30. LiBOB is a type of oxalate complex compound, and has the function of a coating film-forming agent that forms a SEI film by decomposing at a lower potential than the electrolyte solution during initial charging of a non-aqueous electrolyte secondary battery. By suitably forming a SEI film derived from this LiBOB, reductive decomposition of the non-aqueous electrolyte solution does not occur during initial charging and it is possible to stabilize the negative electrode, meaning that it is possible to suitably prevent a decrease in battery capacity.

Here, "highly concentrated LiBOB solution" in the present specification means a highly polar solvent in which LiBOB is dissolved at a concentration that exceeds the saturation concentration in the fluorinated solvent. Moreover, if the concentration of LiBOB in the highly concentrated LiBOB solution is too low, the mixing proportion of the fluorinated solvent may be lowered in order to obtain a non-aqueous electrolyte solution in which the required amount of LiBOB is dissolved, and this leads to concerns that the oxidation resistance of the non-aqueous electrolyte solution following production will deteriorate. Therefore, as much LiBOB as possible may be dissolved in the highly concentrated LiBOB solution (for LiBOB to be dissolved up to the saturation concentration in the highly polar solvent). For example, the concentration of LiBOB in the highly concentrated LiBOB solution may be 1 to 4 M, or even 1.5 to 4 M, for example 2 M.

(5) Mixing Step

In the method for producing a non-aqueous electrolyte solution according to the present embodiment, the mixing step S50 is next carried out, in which the fluorinated solvent is mixed with the highly concentrated LiBOB solution. By carrying out this mixing step S50 in the production method according to the present embodiment, it is possible to obtain a non-aqueous electrolyte solution in which a lithium salt and LiBOB are dissolved in a non-aqueous solvent in which the fluorinated solvent and the highly polar solvent are mixed. Here, the mixing proportions of the fluorinated solvent and the highly concentrated LiBOB solution may be adjusted so that a main component of the non-aqueous solvent following preparation is the fluorinated solvent. Specifically, when the total volume of the non-aqueous solvent is taken as 100 vol %, the mixing proportions of the fluorinated solvent and the highly concentrated LiBOB solution may be adjusted so that the volume of the fluorinated solvent is 80 to 95 vol % (such as 85 to 95 vol %, for example 90 vol %). In this way, it is possible to suitably improve the oxidation resistance of the non-aqueous electrolyte solution following production and suitably prevent a decrease in battery capacity caused by oxidative decomposition at full charge.

In the production method according to the present embodiment, the highly concentrated LiBOB solution is prepared in advance by dissolving a large quantity of LiBOB in a highly polar solvent, and a non-aqueous electrolyte solution is then produced by mixing the highly concentrated LiBOB solution with a fluorinated solvent. In this way, it is possible to obtain a non-aqueous electrolyte solution in which a large quantity of LiBOB is dissolved, despite a main component of the non-aqueous solvent being a fluorinated solvent. Specifically, the saturation concentration of LiBOB in a non-aqueous solvent containing a fluorinated solvent as a main component is generally approximately 0.002 to 0.05 M. However, in a non-aqueous electrolyte solution produced using the production method according to the present embodiment, LiBOB remains in a dissolved state, without precipitating, even at a high concentration of 0.1 M or more. This is thought to be because when the highly concentrated LiBOB solution is prepared, LiBOB molecules are surrounded by highly polar solvent molecules and are in a solvated state, and this solvated state is maintained even after the highly polar solvent is mixed with the fluorinated solvent. In addition, by using this non-aqueous electrolyte solution, oxidative decomposition at full charge and reductive decomposition during initial charging, can be suppressed to a high degree. As a result, it is possible to produce a non-aqueous electrolyte secondary battery in which a reduction in battery capacity is suitably prevented.

Moreover, in a non-aqueous electrolyte solution produced using the production method according to the present embodiment, LiBOB is dissolved at a high concentration of 0.1 M or more, as mentioned above. However, if the non-aqueous electrolyte solution is allowed to stand for a long period of time after being produced, some of the dissolved LiBOB may precipitate. Therefore, in cases where a secondary battery is produced using the non-aqueous electrolyte solution of the present embodiment, the production process may be controlled so that initial charging is carried out and a SEI film derived from LiBOB is formed before LiBOB precipitates. For example, a secondary battery production process may be controlled so as to include a step of housing an electrode body and a non-aqueous electrolyte solution in a battery case and a step of forming a SEI film by carrying out initial charging within 48 hours (or even within 24 hours) of the electrolyte solution being produced. In this way, it is possible to reliably form a SEI film derived from LiBOB before LiBOB precipitates.

An explanation, has been given above of a method for producing a non-aqueous electrolyte solution according to one embodiment of the present disclosure. However, the embodiment described above does not limit the method for producing a non-aqueous electrolyte solution disclosed here, and alterations may be carried out, as appropriate, when necessary.

For example, in the production method according to the embodiment described above, the lithium salt dissolution step S20 for dissolving a lithium salt in a fluorinated solvent is carried out. However, the timing of the dissolution of the lithium salt in the method for producing a non-aqueous electrolyte solution disclosed here is not limited to the embodiments described above. That is, it is possible to carry out a mixing step for preparing a mixed solvent by mixing the fluorinated solvent and the highly concentrated LiBOB solution, and then dissolve a lithium salt in the mixed solvent. In addition, it is possible to dissolve a lithium salt in the highly polar solvent or highly concentrated LiBOB solution rather than in the fluorinated solvent.

However, from the perspective of dissolving a lithium salt with good efficiency, a lithium salt may be dissolved in the fluorinated solvent before mixing with the highly concentrated LiBOB solution, as in the embodiment described above.

2, Non-Aqueous Electrolyte Secondary Battery

Next, as another aspect of the present disclosure, an explanation will be given of a non-aqueous electrolyte secondary battery in which is used a non-aqueous electrolyte solution obtained using the production method according to the embodiment described above.

Figure 2:
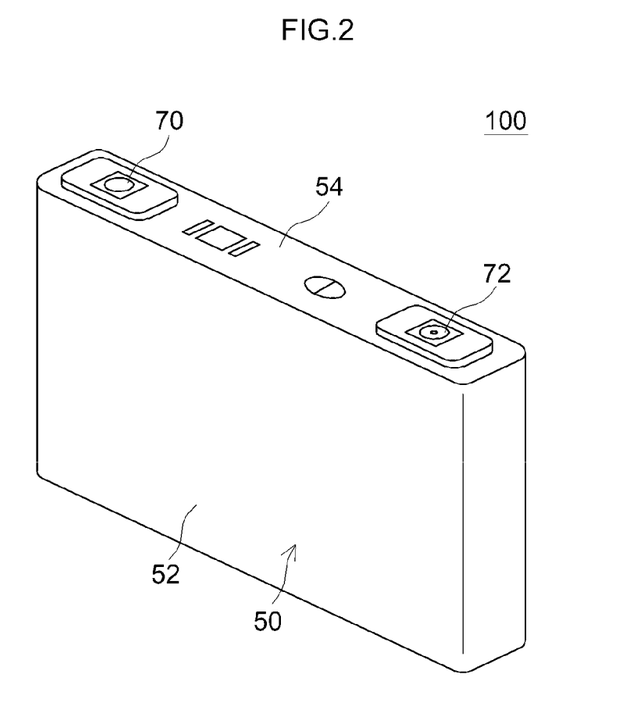
FIG. 2 is a perspective view that schematically illustrates a non-aqueous electrolyte secondary battery according to one embodiment of the present disclosure.
Figure 3:
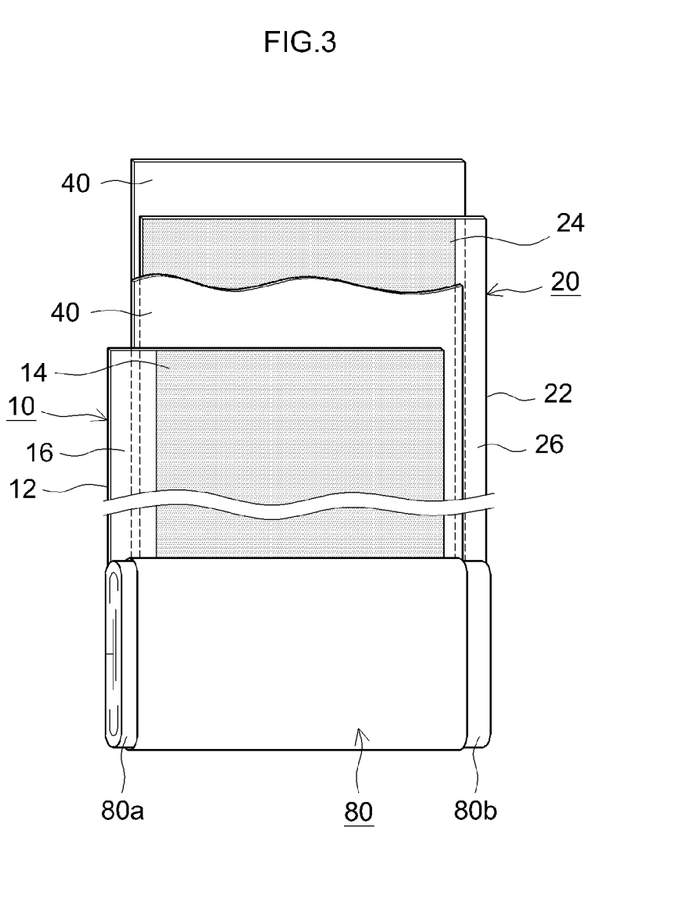
FIG. 3 is a perspective view that schematically illustrates an electrode body of a non-aqueous electrolyte secondary battery according to one embodiment of the present disclosure.

FIG. 2 is a perspective view that schematically illustrates the non-aqueous electrolyte secondary battery according to the present embodiment. In addition, FIG. 3 is a perspective view that schematically illustrates an electrode body used in the non-aqueous electrolyte secondary battery according to the present embodiment.

(1) Battery Case

As Shown in FIG. 2, the non-aqueous electrolyte secondary battery 100 according to the present embodiment is provided with a flat square battery case 50. This battery case 50 is constituted from a flat case main body 52, the upper surface of which is open, and a lid 54, which seals the open part of the upper surface. In addition, a positive electrode terminal 70 and a negative electrode terminal 72 are provided on the lid 54 of the battery case 50.

(2) Electrode Body

In the non-aqueous electrolyte secondary battery 100 according to the present embodiment, an electrode body 80 shown in FIG. 3 is housed inside the battery case 50 shown in FIG. 2. This electrode body 80 is a wound electrode body formed by laminating a sheet-shaped positive electrode 10 and a sheet-shaped negative electrode 20, with a separator 40 interposed therebetween, and winding the obtained laminate. Explanations will now be given of the members that constitute the electrode body 80.

(a) Positive Electrode

As shown in FIG. 3, the positive electrode 10 is formed by applying a positive electrode mixture layer 14 to the surface (both surfaces) of a positive electrode current collector 12 such as an aluminum foil. Moreover, the positive electrode mixture layer 14 is not applied to one edge of the positive electrode 10, thereby forming a current collector exposed part 16. In addition, a positive electrode connection part 80a, which is obtained by winding the current collector exposed part 16 of the positive electrode 10, is formed at one edge of the wound electrode body 80, and the positive electrode terminal 70 mentioned above (see FIG. 2) is connected to the positive electrode connection part 80a.

The positive electrode mixture layer 14 contains a positive electrode active substance that is a lithium composite oxide capable of occluding and releasing lithium ions. One or two or more types of substance used in non-aqueous electrolyte secondary batteries in the past can be used without particular limitation as this positive electrode active substance.

In some embodiments, the positive electrode active substance used may be a high potential positive electrode active substance having an upper limit operating potential (open circuit voltage (OCV)) of 4.35 V or more, based on lithium metal (vs, Li/Li$^+$). In cases where this type of high potential positive electrode active substance is used, it is possible to improve input-output characteristics and energy density, but problems also occur, such as the non-aqueous electrolyte solution readily undergoing oxidative decomposition at full charge. However, because a non-aqueous solvent, which contains a fluorinated solvent as a main component and exhibits high oxidation resistance, is used in the non-aqueous electrolyte solution in the present embodiment, it is possible to suitably suppress oxidative decomposition of the non-aqueous electrolyte solution at full charge, even if a high potential positive electrode active substance is used.

Moreover, examples of high potential positive electrode active substances include lithium-manganese composite oxides having a spinel structure and represented by the general formula: $Li_pMn_{2-q}M_qO_{4+\alpha}$. Here, in this general formula, p is such that $0.9 \le p \le 1.2$, q is such that $0 \le q < 2$ (and typically such that $0 \le q \le 1$, for example $0.2 \le q \le 0.6$), α is such that $-0.2 \le \alpha \le 0.2$, and these are values defined so that charge neutrality conditions are satisfied. In addition, M in the formula may be one or two or more elements selected from among arbitrary metal elements other than Mn and non-metal elements. More specifically, M can be Na, Mg, Ca, Sr, Ti, Zr, V, Nb, Cr, Mo, Fe, Co, Rh, Ni, Pd, Pt, Cu, Zn, B, Al, Ga, In, Sn, La, W, Ce, or the like. Of these, at least one type of transition metal element such as Fe, Co and Ni can be used in some embodiments.

Furthermore, among the lithium-manganese composite oxides having a spinel structure mentioned above, lithium-nickel-manganese composite oxides containing Li, Ni and Mn elements can be used in the positive electrode active substance in some embodiments. This type of lithium-nickel-manganese composite oxide exhibits high thermal stability and high electrical conductivity, and can therefore improve battery performance and durability. This type of lithium-nickel-manganese composite oxide can be represented by, for example, the general formula: $Li_x(Ni_yMn_{2-y-z}M1_z)O_{4+\beta}$. Here, M1 s not present or may be a transition metal element other than Ni or Mn or a typical metal element (for example, one or two or more elements selected from among Fe, Co, Cu, Cr, Zn and Al). Of these, M1 may include at least one of trivalent Fe and Co in some embodiments. Alternatively, M1 may be a metalloid element (for example, one or two or more elements selected from among B, Si and Ge) or a non-metal element. Moreover, in the general formula, x is such that $0.9 \le x \le 1.2$, y is such that $0 < y$, and z is such that $0 \le z$. In addition, $y+z<2$ (and typically, $y+z \le 1$), and β may be the same as α mentioned above. In one aspect, y is such that $0.2 \le y \le 1.0$ (or even such that $0.4 \le y \le 0.6$, for example $0.45 \le y \le 0.55$), and z is such that $0 \le z < 1.0$ (for example, $0 \le z \le 0.3$). $LiNi_{0.5}Mn_{1.5}O_4$ is one example of a lithium-nickel-manganese composite oxide that satisfies this type of general formula.

In addition, the positive electrode mixture layer 14 may contain additives such as electrically conductive materials and binders in addition to the positive electrode active substance mentioned above. A carbon material such as carbon black (typically acetylene black (AB) or ketjen black), active carbon, graphite or carbon fibers can be used as the electrically conductive material in some embodiments. In addition, halogenated vinyl resins such as polyvinylidene fluoride (PVdF) resins and polyalkylene oxide compounds such as polyethylene oxide (PEO) can be used as the binder in some embodiments.

(b) Negative Electrode

The negative electrode 20 is formed by applying a negative electrode mixture layer 24 to the surface (both surfaces) of a negative electrode current collector 22, such as a copper foil. Like the positive electrode 10 mentioned above, the negative electrode mixture layer 24 is not applied to one edge of the negative electrode 20, thereby forming a current collector exposed part 26. In addition, a negative electrode connection part 80b, which is obtained by winding the current collector exposed part 26, is formed at one edge of the wound electrode body 80, and the negative electrode terminal 72 mentioned above (see FIG. 2) is connected to the negative electrode connection part 80b.

In addition, the negative electrode mixture layer 24 contains a negative electrode active substance that is a carbon material capable of occluding and releasing lithium ions. For example, graphite, hard carbon, soft carbon, and the like, can be used as the negative electrode active substance.

In addition, the negative electrode mixture layer 24 may contain additives such as binders and thickening agents in addition to the negative electrode active substance. Examples of binders for the negative electrode mixture layer 24 include styrene-butadiene copolymers (SBR). For example, carboxymethyl cellulose (CMC) or the like can be used as a thickening agent.

(c) Separator

The separator 40 is a porous insulating sheet having ultrafine pores through which lithium ions pass. For example, an insulating resin such as polyethylene (PE), polypropylene (PP), a polyester or a polyamide can be used in the separator 40. In addition, the separator 40 may be a single layer sheet comprising one type of resin sheet, or a multilayer sheet obtained by laminating two or more types of resin sheet. Examples of separators having multilayer structures include sheets having three layer structures obtained by laminating a PE sheet on both surfaces of a PP sheet (a PE/PP/PE sheet).

(3) Non-Aqueous Electrolyte Solution

In the non-aqueous electrolyte secondary battery 100, the non-aqueous electrolyte solution is filled between the positive electrode 10 and negative electrode 20 of the electrode body 80 mentioned above. Here, the non-aqueous electrolyte solution produced in the embodiment mentioned above is used in the non-aqueous electrolyte secondary battery 100 according to the present embodiment. That is, the non-aqueous electrolyte solution used in the present embodiment contains a fluorinated solvent, a highly polar solvent, a lithium salt and LiBOB. Because these materials have already been explained in the embodiment mentioned above, detailed explanations are omitted here.

In addition, a sufficient quantity of LiBOB is dissolved in this non-aqueous electrolyte solution, despite a non-aqueous electrolyte solution containing a fluorinated solvent as a main component being used. Specifically, LiBOB is dissolved at a concentration of 0.1 M or more, despite the volume of the fluorinated solvent being 80 to 95 vol % when the total volume of the non-aqueous solvent is taken as 100 vol %. In this way, because the non-aqueous electrolyte solution used in the non-aqueous electrolyte secondary battery according to the present embodiment suitably contains a fluorinated solvent and LiBOB, it is possible to suppress both oxidative decomposition at full charge and reductive decomposition during initial charging to a high degree.

Moreover, in the non-aqueous electrolyte secondary battery according to the present embodiment, LiBOB in the non-aqueous electrolyte solution decomposes when initial charging is carried out, thereby forming a SEI film derived from the LiBOB. Therefore, in the secondary battery following initial charging, the concentration of LiBOB in the non-aqueous electrolyte solution may be less than 0.1 M. In this case, however, a SEI film derived from LiBOB is formed on a surface of the negative electrode. According to the present embodiment, therefore, it is possible to obtain anon-aqueous electrolyte secondary battery in which a higher amount of a SEI film derived from LiBOB is formed than in the past, despite a non-aqueous electrolyte solution in which a main component of a non-aqueous solvent is a fluorinated solvent being used. For example, when SEIs in non-aqueous electrolyte secondary batteries according to the present embodiment were analyzed and measured in terms of "amount of components in SEI film derived from LiBOB", this amount was approximately 0.1 to 0.4 mg/cm$^2$. Moreover, this "amount of components in SEI film derived from LiBOB" can be determined by measuring the amount of boron (B) components in the SEI film at a surface of the negative electrode by carrying out inductively coupled plasma (ICP) emission spectral analysis.

EXPERIMENTAL EXAMPLES

Explanations will now be given of experimental examples relating to the present disclosure. Moreover, these explanations of experimental examples are not intended to limit the present disclosure.

1. Experimental Examples

In these experimental examples, 19 types of non-aqueous electrolyte solution wore produced using different production processes, and lithium ion secondary batteries (samples 1 to 19) were produced using each of the non-aqueous electrolyte solutions.

(1) Sample 1

In Sample 1, a non-aqueous electrolyte solution was produced by dissolving a lithium salt (LiPF$_6$) and LiBOB in a non-aqueous solvent consisting of a fluorinated solvent, and a lithium ion secondary battery was produced using the non-aqueous electrolyte solution.

Specifically, a fluorinated solvent obtained by mixing 4-fluoroethylene carbonate (FEC) as a fluorinated cyclic carbonate and methyl-2,2,2-trifluoroethyl carbonate (MTFC) as a fluorinated linear carbonate at a ratio of 30:70 was used as a non-aqueous solvent in Sample 1, as shown in Table 1. Next, a lithium salt (LiPF$_6$) was dissolved at a concentration of 1.0 M in the fluorinated solvent, and LiBOB was then dissolved until the saturation solubility was reached. The concentration of LiBOB in Sample 1 was 0.002 M.

Next, a precursor, which was produced by dissolving sulfates of nickel (Ni) and manganese (Mn) and neutralizing with sodium hydroxide (NaOH), and lithium carbonate (Li$_2$CO$_3$) were mixed and fired for 15 hours at 900° C. The fired product was then pulverized to an average particle diameter of 10 μm, thereby obtaining a powder of LiNi$_{0.5}$Mn$_{1.5}$O$_4$ as a high potential positive electrode active substance.

A paste-like positive electrode mixture was then prepared by mixing this LiNi$_{0.5}$Mn$_{1.5}$O$_4$ powder, an electrically conductive material (acetylene black: AB) and a binder (polyvinylidene fluoride: PVDF) at a ratio of 87:10:3 and dispersing in a dispersion medium (N-methylpyrrolidone: NMP). A sheet-shaped positive electrode was produced by coating this positive electrode mixture on both surfaces of a sheet-shaped positive electrode current collector (an aluminum foil), drying the positive electrode mixture, and then extending by rolling.

Next, a paste-like negative electrode mixture was prepared by using a natural graphite powder (average particle diameter 20 μm) as a negative electrode active substance, mixing the natural graphite, a binder (a styrene-butadiene copolymer: SBR) and a thickening agent (carboxymethyl cellulose: CMC) at a ratio of 98:1:1, and dispersing in a dispersion medium (NMP). A sheet-shaped negative electrode was then produced by coating this negative electrode mixture on both surfaces of a negative electrode current collector (a copper foil), drying, and then extending by rolling.

Next, a wound electrode body was produced by laminating the positive electrode and negative electrode, with a separator (PE/PP/PE sheet) interposed therebetween, and then winding the obtained laminate. Here, the sizes of the positive electrode and negative electrode used to produce the electrode body were adjusted so that the design capacity of the produced battery was 14 mAh. Next, a lithium ion secondary battery of Sample 1 was produced by connecting the produced electrode body to the positive electrode terminal and negative electrode terminal and then enclosing in a laminated film together with the non-aqueous electrolyte solution described above.

(2) Samples 2 and 3

In Samples 2 and 3, non-aqueous electrolyte solutions were prepared under the same conditions as those in Sample 1, except that mixed solvents obtained by mixing a fluorinated solvent and a highly polar solvent were used as the non-aqueous solvent, and lithium ion secondary batteries were produced using these non-aqueous electrolyte solutions.

Specifically, in Samples 2 and 3, mixed solvents were produced by mixing FEC and MTFC, which are fluorinated solvents, with ethylene carbonate (EC), which is a highly polar solvent, and a lithium salt and LiBOB were dissolved in these mixed, solvents. Moreover, the mixing proportions of FEC, MTFC and EC were different in Sample 2 and Sample 3. In addition, the concentration of LiBOB in the non-aqueous electrolyte solution of Sample 2 was 0.02 M, and the concentration of LiBOB in the non-aqueous electrolyte solution of Sample 3 was 0.05 M.

(3) Samples 4 to 7

In Samples 4 to 7, a highly concentrated LiBOB solution was prepared in advance, in the same way as in the production method according to the embodiment described above, and lithium ion secondary batteries were then constructed using the same procedure as in Sample 1, except that non-aqueous electrolyte solutions were prepared by mixing the highly concentrated LiBOB solution with a fluorinated solvent.

Specifically, a highly concentrated LiBOB solution having a LiBOB concentration of 2 M was first prepared by dissolving LiBOB in EC, which is a highly polar solvent, and a lithium salt (LiPF$_6$) was dissolved in a fluorinated solvent (FEC and MTFC). Non-aqueous electrolyte solutions were then prepared by mixing the highly concentrated LiBOB solution with the fluorinated solvent. Moreover, in Samples 4 to 7, the mixing ratio of the highly concentrated LiBOB solution and the fluorinated solvent were altered and the concentration of LiBOB in the non-aqueous electrolyte solution was altered. Details are shown in Table 1.

(4) Samples 8 to 10

In Samples 8 to 10, non-aqueous electrolyte solutions were prepared under the same conditions as those in Samples 4 to 7, except that propylene carbonate (PC) was used as the highly polar solvent, and lithium ion secondary batteries were; produced using these non-aqueous electrolyte solutions. Moreover, in Samples 8 to 10, the mixing ratio of the highly concentrated LiBOB solution (PC solution having a LiBOB concentration of 2 M) and the fluorinated solvent was altered in the manner shown in Table 1.

(5) Samples 11 to 13

In Samples 11 to 13, non-aqueous electrolyte solutions were prepared under the same conditions as those in Samples 4 to 7, except that sulfolane (SL) was used as the highly polar solvent, and lithium ion secondary batteries were produced using these non-aqueous electrolyte solutions. Moreover, in Samples 11 to 13, the mixing ratio of the highly concentrated LiBOB solution (SL Solution having a LiBOB concentration of 2 M) and the fluorinated solvent was altered in the manner shown in Table 1.

(6) Samples 14 to 16

In Samples 14 to 16, non-aqueous electrolyte solutions were prepared under the same conditions as those in Samples 4 to 7, except that 1,3-propane sultone (PS) was used as the highly polar solvent, and lithium ion secondary batteries were produced using these non-aqueous electrolyte solutions. Moreover, in Samples 14 to 16, the mixing ratio of the highly concentrated LiBOB solution (PS solution having a LiBOB concentration of 2 M) and the fluorinated solvent was altered in the manner shown in Table 1.

(7) Samples 17 to 19

In Samples 17 to 19, non-aqueous electrolyte solutions were prepared under the same conditions as those in Samples 4 to 7, except that 1-propene 1,3-sultone (PRS) was used as the highly polar solvent, and lithium ion secondary batteries were produced using these non-aqueous electrolyte solutions. Moreover, in Samples 17 to 19, the mixing ratio of the highly concentrated LiBOB solution (PRS solution having a LiBOB concentration of 2 M) and the fluorinated solvent was altered in the manner shown in Table 1.

2. Evaluation Experiments

In this experiment, the capacity retention rates of the lithium ion secondary batteries of the samples were measured.

Specifically, the lithium ion secondary battery of each sample was activated by being subjected to constant current charging at a current of 1/5 C to a voltage of 4.5 V. and then to constant voltage charging for 20 hours in a high temperature environment at 60° C.

Next, the battery was subjected to constant current charging at a current of ⅕ C to a voltage of 4.9 V and then to constant voltage charging until a current of 1/50 C was reached, and a fully charged state was attained following the charging. The battery was then subjected to constant current discharging at a current of ⅕ C to a voltage of 3.5 V, and the capacity following discharging was deemed to be the initial capacity.

Each sample was then placed in a high temperature environment at 60° C. and subjected to 1000 charging and discharging cycles, with 1 cycle comprising Charging at a current of 2 C to a voltage of 4.9 V and then discharging at a current of 2 C to a voltage of 3.5 V The capacity of each sample was then measured following 1000 cycles, and the capacity retention rate (%) was calculated by dividing the capacity after 1000 cycles by the initial capacity. The calculation results are shown in Table 1.

TABLE 1

| | Non-aqueous solvent (vol %) | | | | | | | | LiBOB solubility | Capacity retention rate |
|---|---|---|---|---|---|---|---|---|---|---|
| | No added LiBOB | | | LiBOB 2M added | | | | | | |
| | FEC | MTFEC | EC | EC | PC | SL | PS | PRS | (M) | (%) |
| Sample 1 | 30 | 70 | — | — | — | — | — | — | 0.002 | 84.1 |
| Sample 2 | 20 | 70 | 10 | — | — | — | — | — | 0.02 | 85.8 |
| Sample 3 | 10 | 70 | 20 | — | — | — | — | — | 0.05 | 83.8 |
| Sample 4 | 25 | 70 | — | 5 | — | — | — | — | 0.10 | 91.1 |
| Sample 5 | 20 | 70 | — | 10 | — | — | — | — | 0.20 | 94.1 |
| Sample 6 | 15 | 70 | — | 15 | — | — | — | — | 0.30 | 95.4 |
| Sample 7 | 10 | 70 | — | 20 | — | — | — | — | 0.40 | 93.2 |
| Sample 8 | 25 | 70 | — | — | 5 | — | — | — | 0.10 | 90.8 |
| Sample 9 | 20 | 70 | — | — | 10 | — | — | — | 0.20 | 93.4 |

TABLE 1-continued

| | Non-aqueous solvent (vol %) | | | | | | | | LiBOB solubility (M) | Capacity retention rate (%) |
| | No added LiBOB | | | LiBOB 2M added | | | | | | |
| | FEC | MTFEC | EC | EC | PC | SL | PS | PRS | | |
|---|---|---|---|---|---|---|---|---|---|---|
| Sample 10 | 15 | 70 | — | — | 15 | — | — | — | 0.30 | 93.9 |
| Sample 11 | 25 | 70 | — | — | — | 5 | — | — | 0.10 | 90.3 |
| Sample 12 | 20 | 70 | — | — | — | 10 | — | — | 0.20 | 92.2 |
| Sample 13 | 15 | 70 | — | — | — | 15 | — | — | 0.30 | 92.9 |
| Sample 14 | 25 | 70 | — | — | — | — | 5 | — | 0.10 | 89.8 |
| Sample 15 | 20 | 70 | — | — | — | — | 10 | — | 0.20 | 91.1 |
| Sample 16 | 15 | 70 | — | — | — | — | 15 | — | 0.30 | 92.2 |
| Sample 17 | 25 | 70 | — | — | — | — | — | 5 | 0.10 | 98.5 |
| Sample 18 | 20 | 70 | — | — | — | — | — | 10 | 0.20 | 90.9 |
| Sample 19 | 15 | 70 | — | — | — | — | — | 15 | 0.30 | 90.3 |

3, Evaluation Results

In view of Samples 1 to 3 in Table 1, it was confirmed that cases in which a mixed solvent containing a highly polar solvent (EC) was used had a higher LiBOB saturation solubility than cases in which a non-aqueous solvent consisting of a fluorinated solvent was used. Comparing Sample 2 with Sample 3, however, Sample 3 had a lower capacity retention rate than Sample 2, despite having a higher amount of dissolved LiBOB. It is understood that this is because the mixing proportion of the fluorinated solvent was lower, meaning that the oxidation resistance of the non-aqueous electrolyte solution was lower and it was not possible to suppress oxidative decomposition at full charge.

Meanwhile, in cases where a highly concentrated LiBOB solution was prepared in advance and the highly concentrated LiBOB solution was mixed with a fluorinated solvent, as in Samples 4 to 19, it was possible to prepare a non-aqueous electrolyte solution in which a large quantity of LiBOB was dissolved, such as 0.1 M or more, despite containing 80 vol % or more of a fluorinated solvent. In addition, non-aqueous electrolyte secondary batteries constructed using these non-aqueous electrolyte solutions had extremely high capacity retention rates of 89% or more.

Therefore, it was understood that in cases where a highly concentrated LiBOB solution is prepared in advance and the highly concentrated LiBOB solution is mixed with a fluorinated solvent, it is possible to prepare a non-aqueous electrolyte solution in which LiBOB is dissolved in an amount greater than the saturation solubility, and it is possible to construct a non-aqueous electrolyte secondary battery having excellent battery capacity by using this type of non-aqueous electrolyte solution.

Specific examples of the present disclosure have been explained in detail above, but these are merely examples, and do not limit the scope of the disclosure. The features set forth in the claims also encompass modes obtained by variously modifying or altering the specific examples shown above.

What is claimed is:

1. A method for producing a non-aqueous electrolyte solution in which a lithium salt is dissolved in a non-aqueous solvent that contains a fluorinated solvent as a main component, the method comprising:
    a fluorinated solvent provision step for providing the fluorinated solvent,
    a highly polar solvent provision step for providing a highly polar solvent having a relative dielectric constant of 40 or more,
    a LiBOB dissolution step for preparing a highly concentrated LiBOB solution by dissolving LiBOB in the highly polar solvent at a concentration that exceeds the saturation concentration in the fluorinated solvent, and
    a mixing step for mixing the fluorinated solvent with the highly concentrated LiBOB solution,
    wherein the highly polar solvent contains any of ethylene carbonate, propylene carbonate, sulfolane, 1,3-propane sultone or 1-propene 1,3-sultone,
    wherein the fluorinated solvent comprises a fluorinated cyclic carbonate and a fluorinated linear carbonate,
    wherein the concentration of LiBOB in the highly concentrated LiBOB solution is 1 to 4 M, and
    wherein the concentration of LiBOB in the non-aqueous electrolyte solution is 0.1 M to 0.4 M.

2. The method for producing the non-aqueous electrolyte solution according to claim 1, wherein the volume of the fluorinated solvent is 80 to 95 vol % when the total volume of the non-aqueous solvent is taken as 100 vol %.

3. The method for producing the non-aqueous electrolyte solution according to claim 1, wherein a lithium salt dissolution step for dissolving the lithium salt in the fluorinated solvent is carried out before carrying out the mixing step.

4. The method for producing the non-aqueous electrolyte solution according to claim 1, wherein the fluorinated cyclic carbonate is any of 4-fluoroethylene carbonate, 4,5-difluoroethylene carbonate or trifluoromethylethylene carbonate.

5. The method for producing the non-aqueous electrolyte solution according to claim 1, wherein the fluorinated linear carbonate is methyl-2,2,2-trifluoroethyl carbonate.

6. The method for producing the non-aqueous electrolyte solution according to claim 1, wherein the vol % ratio of the fluorinated cyclic carbonate to the fluorinated linear carbonate is from 10:70 to 30:70.

7. The method for producing the non-aqueous electrolyte solution according to claim 1, wherein the lithium salt comprises $LiPF_6$, $LiBF_4$, $LiClO_4$, $LiAsF_6$, $LiCF_3SO_3$, $LiC_4F_9SO_3$, $LiN(CF_3SO_2)_2$, $LiC(CF_3SO_2)_3$, $LiI$ or $LiN(FSO_2)_2$.

8. The method for producing the non-aqueous electrolyte solution according to claim 1, wherein the ratio of the highly polar solvent to the fluorinated cyclic carbonate is 5:25 to 20:10.

9. A method for producing a non-aqueous electrolyte solution in which a lithium salt is dissolved in a non-aqueous solvent that contains a fluorinated solvent as a main component, the method comprising:
    a fluorinated solvent provision step for providing the fluorinated solvent, a highly polar solvent provision step for providing a highly polar solvent having a relative dielectric constant of 40 or more, a LiBOB dissolution step for preparing a highly concentrated LiBOB solution by dissolving LiBOB in the highly polar solvent at a concentration that exceeds the saturation concentration in the fluorinated solvent, and a mixing step for mixing the fluorinated solvent with the highly concentrated LiBOB solution, wherein a capacity retention rate of a non-aqueous electrolyte secondary battery using the non-aqueous electrolyte solution is greater than 90%, wherein the fluorinated solvent comprises a fluorinated cyclic carbonate and a fluorinated linear carbonate, wherein the concentration of LiBOB in the highly concentrated LiBOB solution is 1 to 4 M, and wherein the concentration of LiBOB in the non-aqueous electrolyte solution is 0.1 M to 0.4 M.

10. The method for producing the non-aqueous electrolyte solution according to claim 9, wherein the volume of the fluorinated solvent is 80 to 95 vol % when the total volume of the non-aqueous solvent is taken as 100 vol %.

11. The method for producing the non-aqueous electrolyte solution according to claim 9, wherein a lithium salt dissolution step for dissolving the lithium salt in the fluorinated solvent is carried out before carrying out the mixing step.

12. The method for producing the non-aqueous electrolyte solution according to claim 9, wherein the highly polar solvent contains any of ethylene carbonate, propylene carbonate, sulfolane, 1,3-propane sultone or 1-propene 1,3-sultone.

13. The method for producing the non-aqueous electrolyte solution according to claim 9, wherein the fluorinated cyclic carbonate is any of 4-fluoroethylene carbonate, 4,5-difluoroethylene carbonate or trifluoromethylethylene carbonate.

14. The method for producing the non-aqueous electrolyte solution according to claim 9, wherein the fluorinated linear carbonate is methyl-2,2,2-trifluoroethyl carbonate.

15. The method for producing the non-aqueous electrolyte solution according to claim 9, wherein the vol % ratio of the fluorinated cyclic carbonate to the fluorinated linear carbonate is from 10:70 to 30:70.

16. The method for producing the non-aqueous electrolyte solution according to claim 9, wherein the lithium salt comprises $LiPF_6$, $LiBF_4$, $LiClO_4$, $LiAsF_6$, $LiCF_3SO_3$, $LiC_4F_9SO_3$, $LiN(CF_3SO_2)_2$, $LiC(CF_3SO_2)_3$, LiI or $LiN(FSO_2)_2$.

17. The method for producing the non-aqueous electrolyte solution according to claim 9, wherein the ratio of the highly polar solvent to the fluorinated cyclic carbonate is 5:25 to 20:10.

* * * * *